2,979,495

ETHYLENE POLYMERIZATION PROCESS IN WHICH THE KEROSENE SUSPENDING MEDIUM IS RECOVERED

James V. Cavender, Jr., Texas City, Tex., assignor to Monsanto Chemical Company, St. Louis, Mo., a corporation of Delaware No Drawing. Filed May 14, 1956, Ser. No. 584,874

2 Claims. (Cl. 260—94.9)

This invention relates to the polymerization of hydrocarbons. More particularly, it relates to an improvement in the process for the production of Ziegler-type polymers, relating specifically to a method for cleaning up the catalyst suspending agent employed to render it suitable for recycle purposes.

There has recently come into commercial prominence a process whereby ethylene and other polymerizable hydrocarbons may be polymerized at low temperatures and pressures to yield products of high molecular weight superior in many respects to those produced by the high pressure techniques previously practiced in the art. This process has been made possible through the agency of a type of catalyst developed by Dr. Karl Ziegler of the Max Planck Institute at Mulheim, Ruhr, Germany and has come to be commonly termed the "Ziegler process" while the products so produced are as commonly referred to as "Ziegler-type polymers." Many variations of the catalyst have been disclosed but probably the preferred group is that described in Belgian Patent No. 533,362, issued May 16, 1955, to Ziegler, the disclosure of which is incorporated herein by reference, namely, catalysts prepared by the interaction of a trialkylaluminum with a compound of a metal of group IV–B, V–B, or VI–B of the periodic system including thorium and uranium, and especially compounds of titanium, zirconium and chromium.

As the process is ordinarily conducted, the catalyst is suspended in a suitable liquid organic medium or solvent and the polymerizable hydrocarbon is bubbled through the system at a temperature anywhere in the range from 0° C. to 100° C. Upon completion of the reaction, the polymer is recovered by first destroying the catalyst by quenching it with an alcohol and then separating the solid polymer from the reaction mixture by filtration or centrifugation. Thereafter for practical and economic reasons, the catalyst suspending agent or solvent must be recovered for re-use. The state of purity required in the solvent is critical. It is imperative that the used solvent be recovered in an extremely pure state, since any impurity present in it such as water, acids, compounds with active hydrogen, oxygen, etc., interfere seriously with respect to formation of the active catalyst. Because the solvent in this case is contaminated with catalyst residues and frequently has a solids content up to as high as 1%, some specific problems arise which are not encountered in the usual solvent recovery systems. Conventional distillation techniques which are practical can be used to remove the major portion of the alcohol contained in the mixed solvents of the reaction mixture, but they are not effective in removing other contaminants from the solvent. Neither is distillation after water-washing of the contaminated solvent an acceptable technique for producing useable material for recycling. It has now been discovered, however, that after it has been separated from the quench medium, washing or scrubbing of the contaminated solvent with concentrated sulfuric acid will render it sufficiently pure for re-use in the process.

It is an object of the invention, therefore, to provide a method whereby the used solvent or catalyst suspending agent in the Ziegler process for the polymerization of polymerizable hydrocarbons is recovered in a purified state for recycling to the process.

Other objects and advantages of the invention will become apparent from the following description and appended claims.

According to the invention, solvent or catalyst suspending agent suitable for recycle to the catalyst preparation step in the Ziegler process is prepared by subjecting used solvent or catalyst suspending agent to washing or scrubbing with concentrated sulfuric acid. The acid-washed solvent can then be separated from the acid, washed with alkali to remove any residual traces of acid, dried, and distilled, or handled in any other conventional manner to yield a product containing essentially no contaminants so that it performs in a manner comparable to the fresh solvent when employed in the polymerization reaction.

The following example is presented as illustrative of the invention, but is not to be construed as limiting it in any manner other than it is limited in the appended claims.

Example I

A polymerization run was made employing ethylene as the feed material and kerosene as the solvent or catalyst suspending agent. Kerosene, purified by distillation to remove any moisture present, was metered to a dry reaction vessel and heated to 65° C. The catalyst, a mixture of triisobutylaluminum and titanium tetrachloride, was measured into the reaction vessel with stirring. Ethylene was metered into the reactor near the bottom with agitation and the temperature of the reactor was maintained at 65° C. by the use of cooling water. After all the ethylene had been reacted, the reaction mixture was transferred to a quench tank containing isobutanol where the catalyst complex was reacted with the isobutanol and thus dissolved in the mixed solvents. The quenched mixture was heated to 97–100° C. for two hours, then was cooled rapidly to 25–30° C. The quenched mixture was filtered and the solid ethylene polymer therein was separated, dried, densified, and packaged.

The resulting filtrate liquor or mixed solvents from the quench step containing a small amount of solids was fractionated under reduced pressure to remove isobutanol therefrom. The bottoms from this fractionation, representing the used solvent and containing all the catalyst residues, were fed over a 24-hour period at a rate of 100 lb. per hour together with concentrated sulfuric acid at a rate of 10 lb. per hour to a mixing pump where they were thoroughly and intimately contacted at ambient temperature for a period of approximately 10 minutes. The resulting acid-kerosene mixture was transferred to a settling tank where the acid and kerosene separated into discrete layers during a settling time of approximately one hour. The acid-washed kerosene was then drawn off and charged at a rate of 100 lb. per hour together with 10 lb. per hour of dilute sodium hydroxide (5%) to a mixing pump where the two were intimately mixed to neutralize any traces of acid in the kerosene. The alkali-kerosene mixture was run into a separator for phase separation and the kerosene layer was withdrawn, heated under vacuum to distill off the water, and then fractionated under vacuum to recover the pure kerosene.

A sample of the kerosene so recovered was used in a polymerization run as the solvent or catalyst suspending agent as described above to make polyethylene. No difficulties of any kind were experienced in the polymerization process and the polymer produced was of a quality comparable to that made when fresh kerosene was employed.

While the example describes the catalyst suspending agent or solvent as kerosene, the polymerizable hydrocarbon as ethylene, and the catalyst as a mixture of trialkylaluminum and titanium tetrachloride, the invention is not to be considered as limited in its applicability to this particular system. Many variations may be made in the process conditions and reactants without departing from the scope of the invention. For example, the catalyst composition can be varied substantially from that described. In addition to the type catalyst disclosed in the examples and in the Belgian Patent No. 533,362 mentioned earlier, other catalysts of the Ziegler type which differ in various ways from this one may be employed. For example, instead of or in addition to the aluminum trialkyls, catalysts of the type described in the Belgian patent can be made by reacting the various metal compounds of groups IV–B, V–B and VI–B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihydrides, alkyl or aryl aluminum dialkoxy or diaryloxy compounds, dialkyl or diaryl aluminum alkoxy or aryloxy compounds. Similarly, instead of or in addition to the organo-aluminum compounds, organic compounds of magnesium or zinc can be used and these can contain either one or two hydrocarbon radicals, those of special interest being Grignard compounds, magnesium dialkyls, mixed organo zinc compounds such as $C_2H_5ZnI$ and zinc dialkyls, all of these, of course, being reacted with compounds of groups IV–B, V–B or VI–B metals.

Another Ziegler-type catalyst is prepared by the interaction of an aluminum compound of the general formula $R_2AlX$ where R is a hydrocarbon radical such as alkyl or aryl and X is a halogen, such as chlorine or bromine with a compound of a metal of group VIII of the periodic system, such as iron, nickel, cobalt, platinum or manganese, for example, dimethylaluminum monobromide plus ferric chloride, diisobutylaluminum chloride plus nickel (trivalent) chloride, diethylaluminum monochloride plus manganic chloride. Yet another combination is that of group IV–B, V–B, or VI–B metal compounds with aluminum compounds of the general formula $R_2AlX$, where R is hydrogen or a hydrocarbon radical and X is the radical of a secondary amine, a secondary acid amide, a mercaptan, a thiophenol, a carboxylic acid, or a sulfonic acid, e.g., piperidyl diethylaluminum plus $TiCl_4$, dimethylaminodiethylaluminum plus zirconium tetrachloride, ethylmercaptodiethylaluminum plus $TiCl_4$. Another of the classes of Ziegler type polymerization catalysts comprises compounds of the group IV–B, V–B, or VI–B heavy metals as previously mentioned, combined with the alkali metal alkyls, for example, with lithium-, sodium-, or potassium methyl, -ethyl, -benzyl, -isobutyl, or with complex compounds of such alkali metal alkyls with organic compounds of aluminum, magnesium or zinc as mentioned above, or complex compounds of alkali metal hydrides with such organic compounds of aluminum, magnesium or zinc, for example, butyl lithium plus zirconium tetrachloride, sodium tetramethylaluminum plus titanium tetrachloride or plus thorium acetylacetonate. Still other Ziegler-type catalysts are prepared by using (in conjunction with compounds of group IV–B, V–B, or VI–B metals), instead of trialkylaluminums, triaryl-, triarylalkyl-, trialkaryl-, or mixed alkyl- and aryl-aluminum, zinc, magnesium or alkali metals, e.g., phenyl sodium plus $TiCl_4$.

While the principal classes of Ziegler catalysts have been listed, this listing is not to be construed as complete, and various other such catalysts than those set forth may also be used in the process in which the improvement described in the present application is applicable. Thus, ethylene and other monomers can be polymerized by catalysts obtained by treating compounds of heavy metals, especially compounds of the group IV–B, V–B and VI–B metals, not with organo-metallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture, and compounds containing active hydrogen atoms as determined by the Zerewitinoff method. Polymers of low to medium molecular weight can be obtained from ethylene and other monomers by using trialkylaluminums alone as catalysts, especially in very small amounts, as well as dialkyl berylliums, trialkyl galliums, trialkyl indiums, monoalkylaluminum dihydrides, and the various other catalysts disclosed by Ziegler in U.S. Patent No. 2,699,457. Attention is further directed to the teaching of various of the foregoing catalysts in Ziegler's Belgian Patents 534,792 and 534,888, the disclosures of which are hereby incorporated herein by reference. The essence of the present invention, however, is not to be found in the particular Ziegler type polymerization catalyst employed in making the polymers in question, but rather in the recovery of the inert organic solvent or catalyst suspending agent employed in a state suitable for recycle in the process.

The preferred catalysts are prepared by the interaction of (a) an aluminum compound of the general formula $R_2AlX$ wherein R is an alkyl, cycloalkyl, or aryl radical and X is hydrogen, halogen, or an alkyl, cycloalkyl, or aryl radical with (b) a metal halide selected from the group consisting of the chlorides, bromides, and iodides of titanium and zirconium.

By way of example, but not limitation, the following suitable aluminum compounds are mention:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-(β-phenylethyl)aluminum
Diethylaluminum chloride
Diisobutylaluminum chloride
Diisobutylaluminum iodide
Di-(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n- butoxide, or fluorides of titanium or zirconium, or complexes such as zirconium acetlyacetonate, $K_2TiF_6$, or salts of organic acids such as the acetates, benzoates, etc., of titanium and zirconium, can be used to prepare catalysts with at least some activity and to that extent can be considered equivalents of the halides. However, such compounds are usually prepared from the halides and, hence, are more costly, and also are usually less active, so their use is economically sound only where in a particular situation, favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced ni valence by the reaction of the added aluminum compound. The mol ratio of aluminum compound to titanium (or zirconium) compound, or stated another and simpler way, the mol ratio of aluminum to titanium (or zirconium), can vary over a wide range, suitable values being from 0.3:1 to 10:1 on up to 15:1 or higher. It is generally preferred to use an Al:Ti mole ratio between 1:3 and 5:1. The same ratios apply in the case of zirconium compounds.

While active catalysts can be prepared by a variety of procedures, the simplest and perhaps most effective is to add the titanium or zirconium halide to the aluminum compound, preferably in the presence of comparatively small amounts of an inert organic solvent. The reverse order of addition of reactants can also be used. Such solvents can suitably be saturated aliphatic and alicyclic, and aromatic hydrocarbons, halogenated hydrocarbons, and saturated ethers. By way of example may be mentioned liquefied propane, isobutane, normal butane, n-hexane, the various isomeric hexanes, cyclohexane, methylcyclopentane, dimethylcyclohexane, dodecane, industrial solvents composed of saturated and/or aromatic hydrocarbons such as kerosenes, naphthas, etc., especially when hydrogenated to remove any olefinic compounds, and especially those ranging in boiling point up to 600° F. Also, benzene, toluene, ethylbenzene (very convenient in the case of polymerization of styrene as the separation of styrene from ethylbenzene used as a starting material for the production of styrene is unnecessary), cumene, Decalin, ethylene dichloride, chlorobenzene, diethyl ether, o-dichlorobenzene, dibutyl ether, and the like.

The quantity of solvent used in the reaction mixture is subject to substantial variation. The amount of the solvent may be kept low in the reaction mixture, such as from 0 to 0.5 part by weight of inert organic solvent (i.e., inert to the reactants and catalyst under the conditions employed), per part by weight total polymer produced. However, it is often helpful in obtaining sufficient contact between monomer and catalyst and in aiding removal of heat of reaction to employ larger amounts of solvent, for example, from 5 to 30 parts by weight of solvent per part by weight of total polymer produced.

The amount of catalyst required is comparatively small. Amounts as small as 0.01 weight percent based on total weight of monomer charged are sometimes permissible, although it is usually desirable to use in the neighborhood of 0.1 to 5.0 percent. Larger amounts up to, say, 20 percent or higher are also satisfactory.

The polymerizable hydrocarbon monomer or mixtures of one or more such hydrocarbons is contacted with the catalyst in any convenient manner, preferably merely by bringing the catalyst and monomer together with intimate agitation provided by suitable stirring or other means. The agitation can be continued during the polymerization, or the polymerization mixture can be allowed to remain quiescent while the polymerization takes place.

The polymerization reaction can be effected over a wide range of temperatures, such as from 0° C. to temperatures ranging up to 100° C. and higher if desired. It is seldom advantageous, however, to exceed temperatures of about 70° C. during the polymerization reaction, and room temperature (25° C.) is quite satisfactory.

The reaction is suitably carried out at atmospheric pressure or higher. Although sub-atmospheric pressures are permissible, there would seldom be any advantage in their use. Pressures ranging from atmospheric up to several hundred or even many thousand pounds per square inch, e.g., 50,000 p.s.i. and higher, are suitable. While it is not necessary to use the higher pressures in order to obtain reaction, they will have at times a desirable effect on reaction rate and in some instances on polymer quality. The choice of whether or not to use an appreciably elevated pressure will be one of economic and practical considerations, taking into account the advantages that can be gained thereby.

After the polymerization reaction is complete, prior to the separation of the polymer from the reaction mixture and before any catalyst poisons have contacted the catalyst, the catalyst is destroyed by treating it with an alcohol at a temperature above 90° C. Any alcohol can be used for this purpose, although alkyl alcohols produce the best results. Alkyl alcohols containing from 1 to 8 carbon atoms are particularly desirable and alkyl alcohols containing from 3 to 8 carbon atoms are particularly preferred. Alcohols that can be used for this purpose are methyl alcohol, ethyl alcohol, propyl alcohol, n-butyl alcohol, isobutyl alcohol, tert.-butyl alcohol, butyl alcohol, hexyl alcohol, heptyl alcohol, n-octyl alcohol, iso-octyl alcohol, 2-ethylhexyl alcohol, ethylene gycol, triethylene glycol, propylene glycol, benzyl alcohol and methyl phenyl carbinol. While the unsubstituted alcohols are particularly useful, these alcohols can, if desired, be substituted with one or more inert substituents. While the amount of alcohol to be used is subject to wide variation, it is necessary in order to obtain thorough intermixture to use a considerable excess over that theoretically required to react with any catalyst residue in the polymer. Thus, from about 2 to about 200 moles of the alcohol per mole of catalyst present in the polymer can be used. It is generally preferred to use a weight of alcohol which is several times the weight of the polymer being treated. Sufficient alcohol to form a readily stirrable slurry is desirable. In the destruction of the catalyst, the temperature must be maintained above 90° C. and preferably between about 90° C. and about 105° C. Higher temperatures can be used if desired, but do not appear to offer any advantageous results.

After the catalyst destruction is complete, the polymer can be removed from the reaction mixture by any convenient method and this is best accomplished by filtration and preferably in the absence of air. After the polymer is removed from the reaction mixture, the polymer is washed with any suitable solvent in order to remove final traces of the reaction medium. Alkyl alcohols can be used for the purpose and it has been found advantageous at times to wash the polymer with methanolic HCl. After the polymer is thoroughly washed, it is dried by any convenient method.

The examples given have illustrated the process in which the invention is applicable as one directed specifically to the polymerization of ethylene. Obviously, this invention is not limited solely to the clean-up of solvents used in the preparation of polyethylene. The refining technique of the invention is equally useful in processes for the polymerization of other monomers which are polymerizable in the presence of the catalyst defined herein such as propylene, isobutylene, isoprene, butadiene, styrene, vinyl toluene, and the like which may be homopolymerized, or interpolymerized with one another or with one or more other monomers.

In accordance with the process of the invention, the concentration of acid used for solvent clean-up may vary from about 70 to about 100%. Preferably, the usual commercial grade of concentrated sulfuric acid is employed. The volume ratio of acid to used solvent is not critical and ratios anywhere in the broad range from 1 : 50 to 1 : 1 may be used, depending upon the economic considerations deemed important. Preferably, acid-solvent ratios in the range of 1 : 10 to 1 : 20 are preferred.

While the purification is readily effected at ambient temperatures, this does not exclude the use of heat and in some instances it will probably be found advantageous to effect the scrubbing operation at slightly or moderately elevated temperatures, say in the range from 50 to 150° C.

Best results are obtained by intimate mixing of the acid-treating agent with the used solvent or catalyst suspending agent and any type of suitable apparatus for effecting such contact may be used. In addition to a mixing pump, for example, a scrubbing column or tower may be employed. Contact time may also be varied broadly, depending somewhat upon the efficiency of mixing attained. Times in the order of from a few seconds to about an hour are satisfactory, with a contact time of from about 2 to about 10 minutes being preferred.

The acid obtained in the settling operation may be continuously recycled with fresh make-up acid to the scrubbing step.

What is claimed is:

1. In a process for the production of polyethylene wherein ethylene is polymerized by contacting with a catalyst prepared by the interaction of triisobutylaluminum with titanium tetrachloride in the presence of a kerosene solvent as the catalyst suspending medium, said catalyst is quenched after polymerization is complete with an alcohol, and polyethylene is recovered from the reaction mixture, the improvement which comprises recovering the used kerosene for re-use by subjecting said used kerosene to washing with sulfuric acid having a concentration from about 70% to about 100%, separating said kerosene from said acid, withdrawing said acid-treated kerosene and scrubbing it with a dilute aqueous alkali metal hydroxide to neutralize any residual acid therein, separating said kerosene and said alkali, subjecting said kerosense to fractionation, and recovering purifide kerosene.

2. The process of claim 1 wherein said sulfuric acid has a concentration within the range from about 90% to about 98%.

References Cited in the file of this patent

UNITED STATES PATENTS

| | | |
|---|---|---|
| 451,724 | Gordon | May 5, 1891 |
| 2,109,446 | Kendall | Feb. 22, 1938 |
| 2,192,687 | McCleary | Mar. 5, 1940 |
| 2,410,223 | Legatski | Oct. 29, 1946 |
| 2,731,453 | Field et al. | Jan. 17, 1956 |
| 2,838,477 | Roelen et al. | June 10, 1958 |

FOREIGN PATENTS

| | | |
|---|---|---|
| 533,362 | Belgium | May 15, 1955 |

OTHER REFERENCES

Zeitschrift für Anorganische und Allegemeine Chemie for 1942, Band 249, pp. 263–277 (article by Von A. von Endredy and Fr. Brugger).